United States Patent Office 3,695,950
Patented Oct. 3, 1972

3,695,950
AMINO-ALDEHYDE RESIN BLASTING COMPOSITION CONTAINING GASEOUS VOIDS
Willard F. Clark, Midland, Mich., assignor to The Dow Chemical Company, Midland, Mich.
No Drawing. Filed May 15, 1970, Ser. No. 37,839
Int. Cl. C06b 1/00; F42b 1/00
U.S. Cl. 149—19                                    16 Claims

ABSTRACT OF THE DISCLOSURE

A blasting agent is provided which can be cast into pre-formed shapes and forms. The blasting agent comprises at least one particulate inorganic oxidizing salt bound together with an amino resin to form a cohesive mass which is explosive.

BACKGROUND OF THE INVENTION

Blasting agents in the form of pre-formed cast shapes are often employed in boreholes and the like where self-supporting agents are required. In addition, such blasting agents can be employed as boosters for the detonation of other types of explosives. The present invention concerns a castable explosive composition of high density which is substantially impervious to water. The composition can be employed as a booster for the detonation of other explosive compositions.

SUMMARY OF THE INVENTION

The blasting agent of the present invention comprises at least one particulate inorganic oxidizing salt bound together with an amino resin. The composition can be prepared by polymerizing an amine and an aldehyde in the presence of the inorganic oxidizing salt, and allowing the composition to set to form an explosive composition. Likewise, pre-formed amino resins, known in the art as molding compounds, are heated sufficiently to soften them and the inorganic oxidizing salt is mixed therein.

Optionally, other constituents normally employed in inorganic oxidizing salt based explosive compositions can be included in the composition, e.g. metals, density control agents, etc.

Amino resin as employed herein means that group of organic nitrogen rich polymeric materials made by the reaction of an amine and an aldehyde. The amine and aldehyde are employed in such a ratio that polymers are formed which set up to form viscous to hard (molding compounds) compounds. The aldehyde is a compound corresponding to the formula

wherein R is H or an organic group or the radical

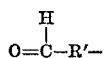

wherein R' is a hydrocarbon. The amine is a compound corresponding to the formula $R_1$—$NH_2$ or $$NH_2—R_2—NH_2$$

wherein $R_1$ and $R_2$ are organic groups.

DETAILED DESCRIPTION OF THE INVENTION

As indicated, the blasting agent of the present invention comprises a dense mass containing a particulate inorganic oxidizing salt bound together with an amino resin. Optionally the blasting agent may contain water, sensitizers and/or fuels, additional thickeners and/or density control agents.

The blasting agent contains from 2 to about 25 percent by weight of said amino resin and from about 20 to about 95 percent by weight of at least one particulate inorganic oxidizing salt.

Preferably the amino resin is a polymer prepared from an amine and an aldehyde having a mole ratio of aldehyde to amine in an amount sufficient to provide a polymer commonly referred to in the amino resins art as a "molding compound." The mole ratio of aldehyde to amine preferably ranges from about 3:2 to 4:3. The aldehyde is preferably a compound corresponding to the formula

wherein R is H, a hydrocarbon containing from 1 to about 6 carbon atoms, or the radical

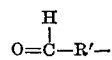

wherein R' is a hydrocarbon containing from 1 to about 3 carbon atoms. More preferably the aldehyde is formaldehyde, acetaldehyde or glyoxal.

The amine is preferably aniline, urea, thiourea, melamine, or ethyleneamine.

Inorganic oxidizing salts which may be employed in the present invention comprise one or more of those salts normally employed in inorganic oxidizing salt explosive compositions known in the art. Exemplary of such salts are alkali and alkaline earth metal and ammonium nitrates, perchlorates, chlorides, chlorates, sulfates, bromates, and mixtures thereof. Specific inorganic oxidizing salts include ammonium nitrate, sodium nitrate, calcium nitrate, ammonium perchlorate, sodium perchlorate, calcium perchlorate, ammonium sulfate, sodium sulfate, calcium sulfate and mixtures thereof. Preferably a major proportion of the inorganic oxidizing salt is ammonium nitrate.

Sensitizers and/or fuels which may be employed include, for example, particulate metals, self-explosives and carbonaceous materials.

Particulate metals include, for example, aluminum, magnesium, boron, ferrosilicon, silicon, ferrophosphorus, titanium, alloys of various of these metals and mixtures thereof. The particle size of the metal is not critical. Preferably the particle size of the metal ranges from about −4 to about +325 mesh (U.S. Standard Sieve Series) and may be employed in amounts up to about 50 percent and more by weight of the blasting agent. Preferably a maximum of about 40 percent of a particulate light metal is employed.

Self-explosive sensitizers and fuels as employed herein designate those nitrated organic substances which, by themselves, are normally considered in the art to be an explosive and which can usually be detonated with a standard blasting cap (e.g. No. 6 or No. 8 cap). Included by way of example are smokeless powder, pentolite, composition B, TNT, cyclotrimethylenetrinitramine (RDX), pentaerythritoltetranitrate (PETN), cyclotetramethylene tetranitramine (RMX), and other similar compounds. Such self-explosives may be employed in amounts up to about 20 percent of the blasting agent.

Similarly carbonaceous fuels can be incorporated into the blasting agent. These carbonaceous fuels include, for example, finely divided charcoal and other similar carbon-containing materials, e.g. sugar, etc., fuel oil and crude oil fractions, molasses and the like. Normally up to about 20 percent by weight of such carbonaceous materials are employed.

Suspending agents and/or thickening agents may be employed in the composition, for example, to suspend the particulate materials until the amino resin has set. Exemplary of such suspending and/or thickening agents are those commonly employed in the explosives art to thicken slurry type explosive compositions. Included are polysaccharides, synthetic polymers and partially synthetic polymers derived from natural occurring polysaccharides and the like. These include galactomannans, e.g. guar gum, karaya gum, polyacrylamides, starches, polyesters, polyethers, cellulosic materials and the like. The exact amount of thickening agent employed depends primarily on the specific agent employed and the desired consistency of the resulting mix.

Various density control agents such as void containing materials made from various metals, thermosetting resins, plastics, clay and glass can also be incorporated in the blasting agent to control to an extent the density of and/or sensitivity of the blasting agent to detonation. Also gaseous forming compounds, e.g. carbonates, may be employed. Also air or other gases may be whipped into the mix during its manufacture. The amount of density control agent to be employed can be varied over a wide range depending on the sensitivity and density desired in the final blasting agent.

Water in an amount ranging from about 2 to about 25 percent by weight of the composition can also be included in the blasting agent.

The blasting agent of the present invention can be prepared in a number of different ways. In one method an amine is added to a solution, e.g. aqueous, of an aldehyde in a reactor equipped with means for heating and cooling the condensation cycle of the polymerization reaction. The other constituents of the blasting agent are incorporated into the mix and distributed evenly therein before the amino resin has set. Various methods of polymerizing the amine-aldehyde starting materials are known in the art. Normally the reaction is very sensitive to pH and temperature. The pH can be controlled by the addition of buffer salts or organic amines such as triethanol amine. The pH of the reaction mix is usually kept slightly alkaline, a pH of 7 to about 8 being preferred. Reaction temperatures are usually low (in the range of 75 to 150° F.) depending on the nature of the product desired.

In another method pre-formed amino resins (e.g. molding compounds) usually in solid form, are heated sufficiently to make the molding compound fluid or semi-fluid. the solid and/or other constituents of the blasting agent are then mixed into the fluid or semi-fluid molding compound and the compound allowed to set. Pre-formed shapes and forms can be provided by pouring the blasting agent into molds and allowing the amino resin to set.

The blasting agent of the present invention may contain as percent by weight of the blasting agent from about 1 to about 25 percent of the amino resin, from about 20 to 96 percent of an inorganic oxidizing salt, from 0 to about 5 percent of a thickening agent, from 0 to about 30 percent of a particulate metal, from about 0 to 20 percent of a self-explosive or other carbonaceous material, and from about 2 to about 25 percent by weight of water.

Preferably, if the blasting agent is to be employed in a general blasting operation it should be substantially oxygen balanced, i.e. the quantity of oxygen present is substantially equal to that required to oxidize and combine with the oxidizable materials, e.g. hydrogen, carbon and metal, in the blasting agent. However, substantial variance from oxygen balance can be tolerated or may even be preferred if, for example, the blasting agent is to be employed as an over-fueled component in the method and compositions of U.S. Pat. Nos. 3,377,909 and 3,462,324. The teachings of these patents are specifically incorporated herein by reference.

EXAMPLE 1

A composition was prepared which obtained the following constituents as parts by weight.

| | |
|---|---|
| Thiourea | 10 |
| $NaNO_3$ | 10 |
| $NH_4NO_3$ | 30 |
| Al (particulate) | 2.5 |
| 37% aqueous solution of formaldehyde | 10 |

A sufficient amount of hollow glass microspheres were added to the initial slurry composition to provide a composition having a density of 1.17 gm./cc. Upon standing the composition set up into a very hard mass. A sample of the above composition weighing about 189 grams was detonated in a lead block test at an ambient temperature of about 73° C. employing a 1/12 pound high density booster. The composition appeared to completely detonate and the lead block showed a deformation of 0.14 inch.

EXAMPLE 2

In a manner similar to that defined in Example 1 the compositions set forth in the following Table I were prepared and detonated with a one-twelfth pound high pressure cast booster.

TABLE I

| Constituents | Composition, parts by weight | | |
|---|---|---|---|
| | 1 | 2 | 3 |
| Thiourea | 10 | 5 | |
| Urea | | 5 | 10 |
| 37 percent aqueous formaldehyde solution (3.7 parts formaldehyde) | 10 | 10 | 10 |
| Ammonium nitrate | 80 | 80 | 80 |
| Particulate aluminum | 10 | 10 | 10 |

Various modifications may be made in the present invention without departing from the spirit or scope thereof for it is understood that I am limited only as defined in the appended claims.

What is claimed is:

1. A hard set blasting agent composition which comprises: at least one particulate inorganic oxidizing salt, and sufficient quantity of an amino-aldehyde resin as a binding agent for the particulate salt to form a set cohesive mass, from 2 to about 25 percent by weight of water, and sufficient gaseous voids dispersed throughout the blasting agent to sensitize the blasting agent to detonation.

2. The blasting agent as defined in claim 1 wherein the amino resin comprises the reaction product of the polymerization reaction of an aldehyde and an amine wherein the aldehyde corresponds to the formula

wherein R is H, an organic group, or a radical corresponding to the formula

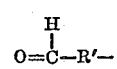

wherein R' is a hydrocarbon, and the amine corresponds to the formula $R_1$—$NH_2$ or $NH_2$—$R_2$—$NH_2$ wherein $R_1$ and $R_2$ are both organic groups.

3. The blasting agent as defined in claim 2 including in addition a particulate metal.

4. The blasting agent as defined in claim 2 including in addition a self-explosive.

5. The blasting agent as defined in claim 2 including in addition a thickening agent.

6. The blasting agent as defined in claim 1 wherein the amino resin comprises the reaction product of the polymerization reaction of an aldehyde and an amine wherein the aldehyde corresponds to the formula $$R-\underset{\underset{H}{|}}{C}=O$$

wherein R is H, a hydrocarbon containing from 1 to about 6 carbon atoms, or the radical $$-R'-\underset{\underset{H}{|}}{C}=O$$

wherein R' is a hydrocarbon containing from 1 to 3 carbon atoms, and the amine is aniline, urea, thiourea, melamine or ethyleneamine.

7. The blasting agent as defined in claim 6 wherein the aldehyde is formaldehyde, acetaldehyde or glyoxal.

8. The blasting agent as defined in claim 7 including in addition a particulate metal.

9. The blasting agent as defined in claim 6 including a particulate metal.

10. A method for preparing a hard set explosive composition which comprises:
  (a) polymerizing an aldehyde in an aqueous solution corresponding to the formula $$R-\underset{\underset{H}{|}}{C}=O$$

wherein R is H, an organic group, or a radical corresponding to the formula $$O=\underset{\underset{H}{|}}{C}-R'$$

wherein R' is a hydrocarbon, with an amine corresponding to the formula $R_1-NH_2$ or $NH_2-R_2-NH_2$ wherein $R_1$ and $R_2$ are organic groups in the presence of at least one inorganic oxidizing salt to provide a cohesive mass having the inorganic oxidizing salt evenly distributed throughout the mass the mass containing from about 2 to about 25 percent of water and
  (b) incorporating gaseous voids into the mass prior to the mass setting up.

11. The process as defined in claim 10 wherein the aldehyde is formaldehyde, acetaldehyde or glyoxal and the amine is aniline, urea, thiourea, melamine or ethyleneamine, and said aldehyde to amine mole ratio ranges from about 3:2 to 4:3.

12. The process as defined in claim 10 wherein the mass is cast into pre-formed shapes.

13. A blasting agent in a cohesive mass form comprising: from about 20 to about 95 percent by weight of at least one particulate inorganic oxidizing salt bound together to form a cohesive mass with from about 2 to about 25 percent by weight of an amino resin comprising the reaction product of an aldehyde and an amine wherein the aldehyde corresponds to the formula $$R-\underset{\underset{H}{|}}{C}=O$$

wherein R is H, an organic group, or a radical corresponding to the formula $$O=\underset{\underset{H}{|}}{C}-R'-$$

wherein R' is a hydrocarbon, and the amine corresponds to the formula $R_1-NH_2$ or $NH_2-R_2-NH_2$ wherein $R_1$ and $R_2$ are both organic groups, and sufficient encapsulated gaseous voids dispersed throughout the composition to sensitize the blasting agent to detonation.

14. The blasting agent as defined in claim 13 wherein a major proportion of the inorganic oxidizing salt is ammonium nitrate.

15. The blasting agent as defined in claim 13 including in addition an effective amount of a sensitizer or fuel.

16. The blasting agent as defined in claim 15 including in addition up to about 40 percent by weight of a particulate light metal.

References Cited
UNITED STATES PATENTS

| | | | |
|---|---|---|---|
| 2,841,481 | 7/1958 | Hall | 149—19 |
| 3,278,350 | 10/1966 | Caldwell et al. | 149—7 |
| 2,630,379 | 3/1953 | Lytle | 149—7 |
| 2,857,258 | 11/1958 | Thomas | 149—19 |
| 2,817,581 | 12/1957 | Rinkenback | 149—20 |

BENJAMIN R. PADGETT, Primary Examiner

U.S. Cl. X.R.

149—20, 21, 44